No. 765,262. PATENTED JULY 19, 1904.
J. H. ANNANDALE.
REFINING ENGINE.
APPLICATION FILED APR. 11, 1904.
NO MODEL. 2 SHEETS—SHEET 1.

Witnesses. Inventor
James Hunter Annandale
by B. Singer
atty.

No. 765,262. PATENTED JULY 19, 1904.
J. H. ANNANDALE.
REFINING ENGINE.
APPLICATION FILED APR. 11, 1904.
NO MODEL. 2 SHEETS—SHEET 2.

Witnesses. Inventor
James Hunter Annandale
by B. Singer
atty.

No. 765,262. Patented July 19, 1904.

UNITED STATES PATENT OFFICE.

JAMES H. ANNANDALE, OF POLTON, SCOTLAND.

REFINING-ENGINE.

SPECIFICATION forming part of Letters Patent No. 765,262, dated July 19, 1904.

Application filed April 11, 1904. Serial No. 202,619. (No model.)

*To all whom it may concern:*

Be it known that I, JAMES H. ANNANDALE, a subject of the King of the United Kingdom of Great Britain and Ireland, of Polton Paper Works, Polton, Mid-Lothian, Scotland, have invented certain new and useful Improvements in Refining-Engines, of which the following is a specification.

This invention has for its object to improve the construction and action of pulp beating or triturating and refining apparatus of the kind exemplified in my United States Patent No. 625,311, of May 23, 1899, in which the fibrous material while passing through the apparatus in a continuous stream is subjected to the disintegrating action of toothed surfaces formed upon the interior of a casing and on a drum rotating thereon, special features of the present invention being that the cutting action is between the side edges of radially-disposed blades or vanes and that provision is made for varying the relative proximity of the cutting edges of the series of blades or vanes by endwise adjustment of the parts carrying them.

The invention is illustrated by way of example in the accompanying drawings, in which—

Figure 1:
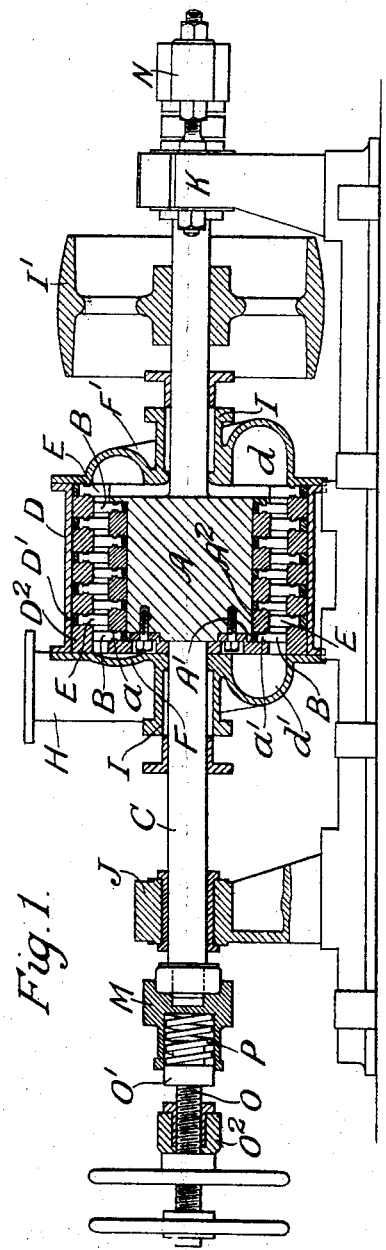
Figure 2:
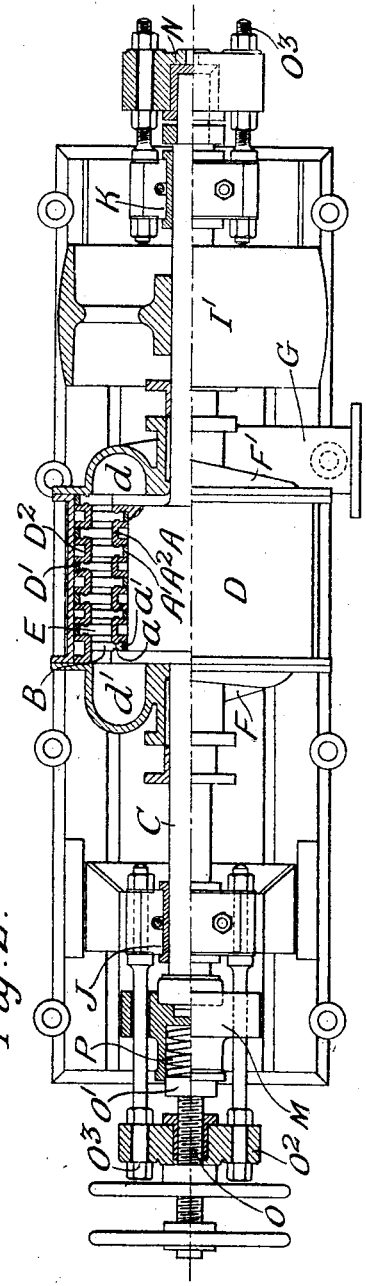
Figure 3:
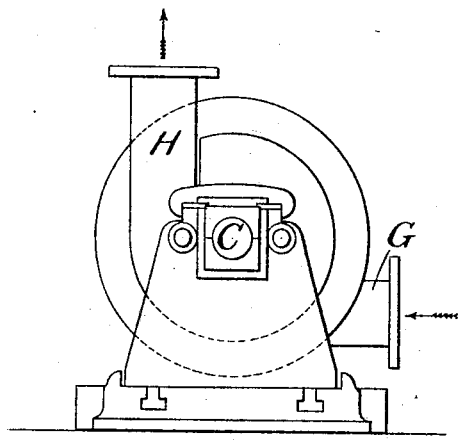
Figure 4:
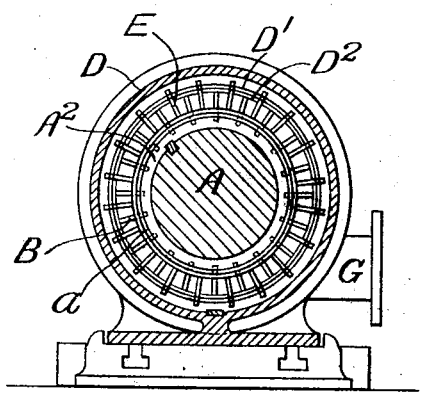

Figure 1 is a longitudinal section of the improved machine. Fig. 2 is a sectional plan, and Fig. 3 an end elevation, while Fig. 4 is a cross-section of the pulp-beating chamber.

As therein illustrated, the improved apparatus comprises a cylindrical drum A, which may be either cast solid or, as shown, made up of a series of disks $A'$ $A^2$, secured upon a central solid drum, and which is furnished with spaced rows of rectangular or other suitable shape of blades or vanes B, suitably spaced and projecting radially or at an inclination, the spaces between the rows of blades across the drum being somewhat wider than the blades themselves. This drum A is secured upon a shaft C and fitted to rotate within a casing D, provided with similar and corresponding rows of inwardly-projecting blades or vanes E, so arranged that they overlap and work into or between those on the drum A, and that the cutting action is between the side edges of the approximately contacting blades or vanes B and E. The spaces between the rows of blades across the circumference are arranged so that a lateral endwise motion of the drum A to one side or other will either bring the side edges of the rows of blades B in the drum A and those E in the casing D into contact or bring them more or less apart, so as to permit of variation of the cutting action.

Each end of the casing D is inclosed by a lid or cover F F', bolted onto it, like the cylinder end of a steam-engine. A pipe G is led into one end for feeding in the material, and an outlet-pipe H is provided at the opposite end. An annular recess or groove $d$ is molded or cut in the inside of each of these end covers, into which on one side the feed-pipe G delivers, and this recess continues all round the circumference opposite the entrance to the blades or vanes, gradually becoming shallower, but not decreasing in width. The effect of this contraction is to drive the inflowing pulp into the action of the blades B E. In like manner the annular recess or groove $d'$ is cut or molded in the cover at the delivery end to receive and collect the pulp which has come through the machine and convey it to the discharge-pipe, the recess becoming deeper as it opens up into the pipe H. At each end of the casing a stuffing-box I is provided for the passage of the shaft C, which carries the drum.

When the drum A is made up of disks, as is preferred, each alternate disk $A'$ may be slotted, as at $a'$, to receive the blade or vanes B, and these again may be secured by rings $a$ on the disks entering the slots in the bars B. The disks $A'$, slotted to receive the blades, are preferably thinner than the separating-disks $A^2$ to allow of a slight end travel of the drum A before bringing the blades B on it in contact with the casing-blades E. The casing D may be also constructed of a series of rings $D'$ $D^2$, of which those, $D'$, carrying the inwardly-projecting teeth E, would be the narrower and slotted to receive the blades and the spacing-rings $d^2$ wider. Thus by separating the disks of the drum A or the rings D' D² of the casing the blades of either may be very easily taken out and renewed when necessary. The blades on the disk or drum, or on either, may be set at an angle, so that the contact may either give a sharp or a blunt cut. The toothed drum A is suspended on the shaft C, which is of suitable strength, with suitable bearings J K, the bearings being constructed to allow of the lateral motion of the drum, which may be driven by a suitable belt-pulley I' or other motive power. Each end of the shaft is received in a step-bearing M N, which may be adjusted by screws O or like means to impart lateral travel to the shaft, and at one end a spring P is intermitted to ease the dead pressure. This spring is carried in the block forming the step-bearing M and is maintained under any desired degree of compression by a block O', on which bears the end of the screw-spindle O, passing through a cross-head O², supported from the bearing-block J. The object of this is to make it possible to beat under any desired severity of contact of the blades from a brushing or softening action to a bruising and cutting action. At the same time the adjustable dead-block N at the opposite end is set to prevent possibility of actual contact of the blades, which is fatal in beating.

In constructing the apparatus for the trituration of rags or woven material the edges of the blades B E where they come in contact should be serrated.

In the operation of the improved apparatus the pulp or other material to be treated is fed through the drum-casing D under pressure either of a sufficient head or of a centrifugal or other pump or by air-pressure applied to the surface of the material, while the toothed drum A is rotated within the casing D, so that while the stuff passes in a somewhat sinuous path or after the fashion of the actuating fluid in a parallel-flow turbine between the blades or vanes B E and the intervening spaces it is cut or bruised by the interaction of the side edges of the rotating blades E and the adjacent edges of the stationary blades B. The triturating action may be varied by varying the speed of rotation of the drum and by bringing the cutting edges of the blades or vanes more or less closely toward contact. Obviously the casing instead of the drum or both casing and drum may be made to rotate to further vary the cutting action.

It is obvious that though the drum A and surrounding casing D are herein shown as of cylindrical form they may be made of slightly-conical shape and each fitted with radial blades adapted to act in the manner set forth on the material forced through the casing.

Having now described my invention, what I claim, and desire to secure by Letters Patent of the United States, is—

1. Apparatus for beating or triturating and refining paper-pulp comprising in combination a drum mounted on a rotating shaft and carrying radially-disposed cutter-blades, a surrounding casing having inwardly-projecting cutter-blades located intermediate of the mentioned blades, and means for imparting resilient endwise adjustment to the drum to bring the adjacent edges of the rotating and stationary blades more or less nearly into contact as described.

2. Apparatus for beating or triturating and refining paper-pulp comprising a casing fitted with inwardly-projecting stationary cutter-blades, a central rotating drum mounted on a shaft and having radially-disposed cutter-blades arranged intermediate of the stationary blades, an end cover to the casing formed with a converging inlet for the material to be treated, and an end cover with a correspondingly-diverging outlet as described.

3. Apparatus for beating or triturating and refining paper-pulp comprising a casing fitted with inwardly-projecting stationary cutter-blades, a central rotating drum mounted on a shaft and having radially-disposed cutter-blades arranged intermediate of the stationary blades, an end cover to the casing formed with a converging inlet for the material to be treated, an end cover with a correspondingly-diverging outlet and means for imparting resilient endwise adjustment to the drum to bring the adjacent edges of the rotating and stationary blades more or less nearly into contact as described.

In testimony whereof I have signed my name to this specification in the presence of two subscribing witnesses.

JAS. H. ANNANDALE.

Witnesses:
WALLACE FAIRWEATHER,
JNO. ARMSTRONG, Jr.